Patented Jan. 7, 1930

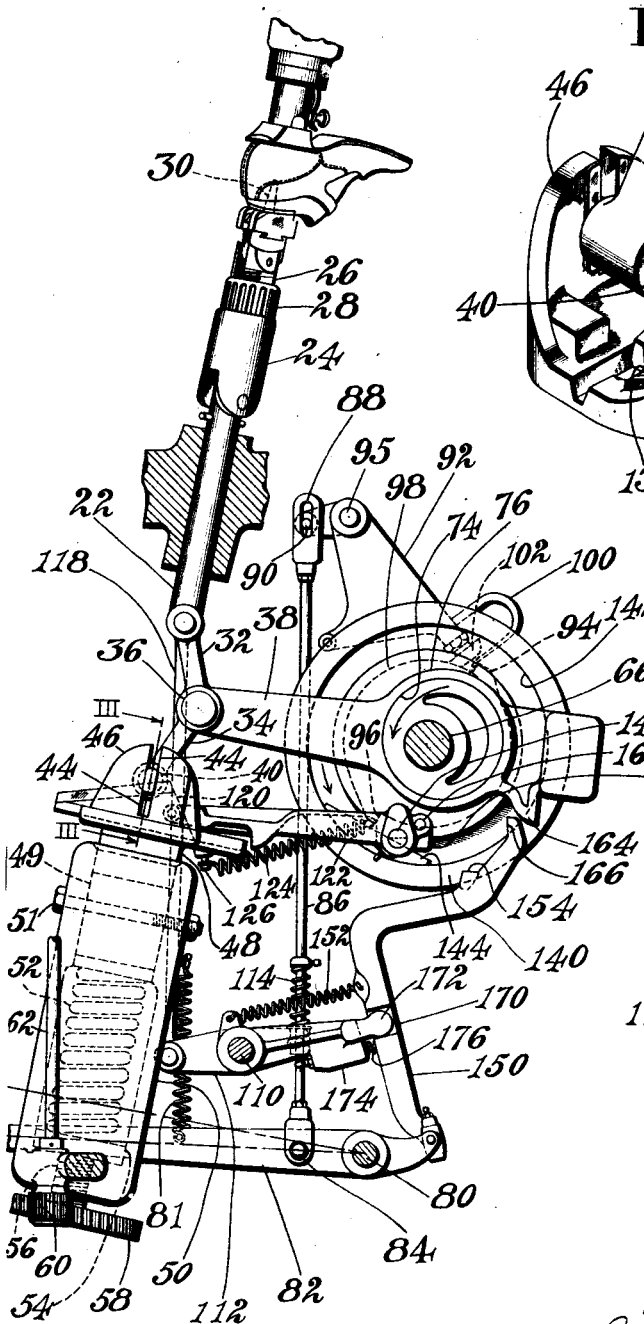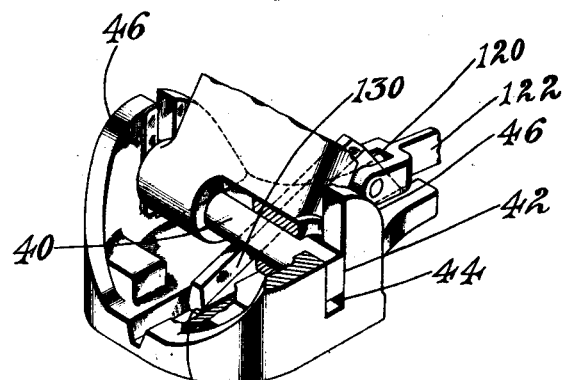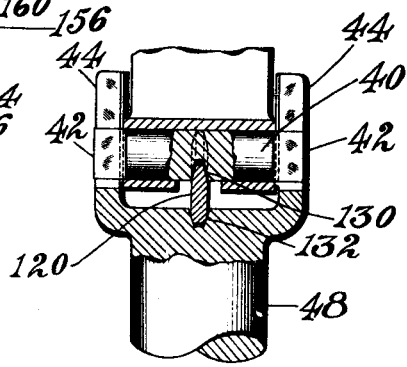

1,742,299

UNITED STATES PATENT OFFICE

MILTON H. BALLARD, OF BEVERLY, AND THOMAS H. SEELY, OF MELROSE, MASSACHUSETTS, ASSIGNORS TO UNITED SHOE MACHINERY CORPORATION, OF PATERSON, NEW JERSEY, A CORPORATION OF NEW JERSEY

HEEL-SEAT-FORMING MACHINE

Application filed December 2, 1926. Serial No. 152,260.

This invention relates to machines which apply pressure to work pieces, for example in the manufacture of shoes, and is illustrated herein as embodied in a heel-seat forming machine arranged to apply molding pressure to the heel-seat portions of shoes to prepare the shoes for the reception of wood heels.

In the manufacture of shoes to which wood heels are to be applied it is usual to trim the surplus stock from the heel-seat portions of the soles of the shoes, beveling the edges of the heel-seat portions of the soles to bring them to a shape approximately complemental to that of the attaching surfaces of the wood heels which are to be attached. In order to provide a solid heel-seat and to cause the heel-seat portion of the sole of the shoe to contact over the greater portion of its area with the attaching surface of the wood heel which is to be attached, heel-seat forming or molding machines have come into use. A heel-seat forming machine is commonly provided with a mold or a pair of molds readily changeable in accordance with the size and shape of the shoe to be operated upon, a work support or a pair of work supports, and means for causing relative movement of each mold and the corresponding work support so as to apply a heavy molding pressure to the heel-seat portion of a shoe mounted upon a last carried by the work support.

It is an object of this invention to provide an improved pressure-applying machine well adapted, for example, for use in molding and forming the heel-seat portions of shoes, having, in combination with its work-engaging and pressure-applying parts, measuring means by virtue of which the pressure-applying movement of the pressure-applying means will be uniformly effective irrespective of variations in the heights or thicknesses of different work pieces operated on. With this object in view the illustrated machine is provided with a work support, means for raising the work support to press the heel-seat portion of a shoe upon a last carried by the work support against a heel-seat forming mold, and a wedge automatically movable transversely of the direction of the application of pressure, the wedge having one or both of its relatively inclined surfaces beveled and engaging correspondingly positioned surfaces formed on appropriate pressure-receiving members. The extent of the movement of the wedge transversely of the direction of the application of pressure automatically varies inversely with the height or thickness of the different work pieces, so that the amount of pressure received by the different work pieces, as a result of equal movements of the pressure-applying means, is uniform irrespective of variations in the height or thickness of the work. The beveling of the relatively inclined surfaces of the wedge and of the parts which those surfaces engage permits the use of a steep and therefore relatively short wedge. Hence a large range of adjustment can be obtained by means of a single wedge of not unwieldy proportions.

While the invention is disclosed herein as embodied in a heel-seat forming machine, it should be understood that in various of its aspects its utility is not limited to machines of that character. Clearly it may be embodied in machines for performing other operations, both in the manufacture of shoes and for other purposes.

With the above and other objects and features in view the invention will now be described in connection with the accompanying drawings and pointed out in the claims.

In the drawings,

Fig. 2 is a side elevation of the principal parts of the machine with most of the frame removed, showing the work support of the machine raised into position ready for the application of pressure to a work piece comprising a shoe mounted upon a last;

Fig. 3 is a vertical section on the line III—III of Fig. 2; and

Fig. 4 is a perspective view of the wedge mechanism shown in cross-section in Fig. 3.

Figure 1:
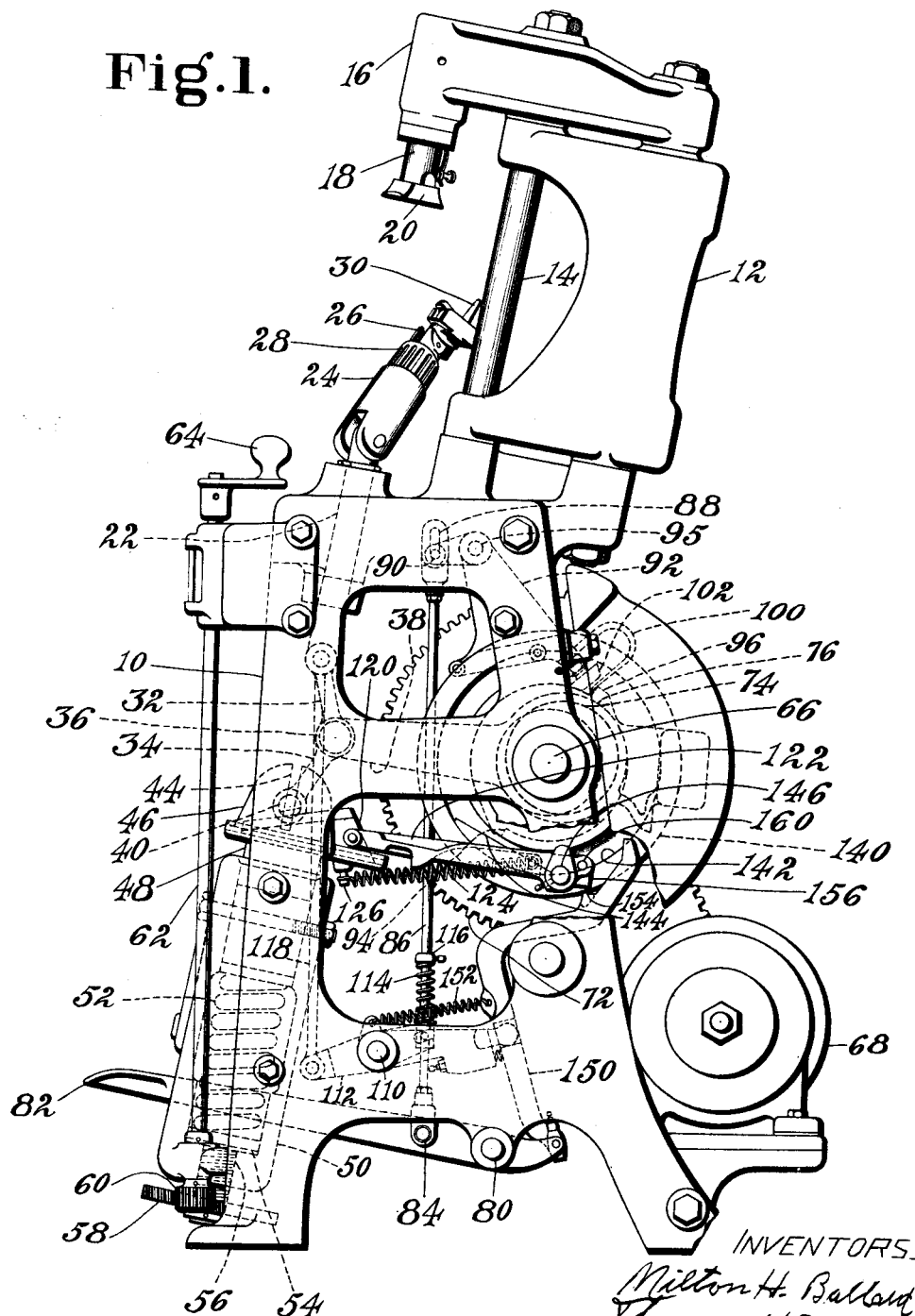
Fig. 1 is a side elevation of a heel-seat forming machine embodying the present invention and showing the machine at rest in its inoperative position.

These drawings illustrate a heel-seat forming machine comprising a press having a work support arranged to receive a shoe mounted upon a last and to present the heel-seat portion of the shoe to a die or mold shaped to give to the heel-seat portion of a shoe a form substantially complemental to that of the attaching face of a wood heel to be applied to the shoe. The machine is provided with treadle-operated mechanism for raising the work support to bring the heel-seat portion of the shoe mounted thereon into engagement with the die or mold so that the shoe may be properly positioned relatively thereto and with power-operated mechanism thrown into operation by further movement of the treadle to apply to the heel-seat portion of the shoe a heavy molding pressure which may be as much as several tons.

The illustrated machine is provided with a frame 10 (Fig. 1) carrying at its upper end a heavy, backwardly tilted framework 12, 14 having a forwardly extending, inclined head 16 at its upper end. Carried by the forward extremity of the head 16 is a die support 18 having a die or mold 20 removably attached thereto. Die 20 is substantially complemental to the form to which the heel-seat surface of the shoe to be operated upon is to be molded and will be changed from time to time in accordance with the size and style of the shoe to be operated upon.

Mounted for sliding movement in an inclined bearing formed in the frame 10 is a shaft 22 (Figs. 1 and 2) having pivoted to its upper end a hollow post 24. Mounted for vertical sliding movement in post 24 is a threaded rod or screw 26 received in a nut 28 by the rotation of which screw 26 can be adjusted vertically. Mounted at the upper end of screw 26 is a last pin 30 the position of which may be adjusted as desired so that the shoe and last upon the work support may be brought into proper relation to mold 20.

Connected to the lower end of shaft 22 is a toggle mechanism comprising two links 32, 34 pivoted at 36 to each other and to an eccentric rod 38. The lower toggle link 34 is formed at its lower end with a bearing for a pin 40 (see particularly Figs. 3 and 4) having flattened ends 42 arranged for sliding movement in a pair of slots 44 formed in a pair of upwardly extending walls 46 carried at the top of a plunger 48 which is mounted for sliding movement in a sleeve 50 formed in or carried by frame 10. Housed in sleeve 50 beneath plunger 48 is a heavy spring 52 arranged to receive the downward thrust of toggle 32, 34 when the toggle is straightened to apply pressure to a work piece. Plunger 48 is provided with a vertical slot 49 through which passes a bolt 51 secured to sleeve 50 and thus serving to hold plunger 48 at all times in engagement with spring 52 and to hold that spring under compression. The extent of slot 49, however, is large enough to permit downward movement of plunger 48 to the full extent required by the straightening of toggle 32, 34.

In order to vary the pressure which may be applied to the work, means is provided for varying the compression of spring 52 independently of the operation of the toggle mechanism so that spring 52 may present a greater or less resistance to downward movement of the toggle. Accordingly, the lower end of spring 52 rests upon a plate 54 carried by a screw 56 threaded into the bottom of sleeve 50 and carrying at its lower end a gear 58 meshing with an elongated pinion 60 on the lower end of a rod 62 mounted in bearings carried by the frame 10 of the machine and carrying at its upper end a hand crank 64 by means of which it may be rotated to raise or lower plate 54.

The frame 10 is provided with bearings for a shaft 66 driven from any suitable source of power such as a motor 68 (Fig. 1) through gearing 72 and a clutch of any suitable type arranged to cause shaft 66 to come to rest after each half revolution thereof, as will be more fully hereinafter described. Carried by shaft 66 is an eccentric 74 engaging an eccentric strap 76 carried by rod 38 (Fig. 2).

Fulcrumed at 80 to the frame of the machine is a treadle 82 having pivoted thereto at 84, forward of its fulcrum 80, an upwardly extending rod 86, the upper end of which is provided with a slot 88 engaging a pin 90 carried by a clutch-controlling lever 92 which is pivoted at 95 to the frame of the machine. A spring 81 tends to hold the treadle 82 in elevated position.

The clutch hereinbefore referred to, which may be, for example, a dog clutch of the well-known type having a semi-circular pin arranged for rotation through an angle of 90° to and from power-transmitting position, becomes operative to transmit power when lever 92 is rotated a short distance counter-clockwise from the position in which it is shown in Figs. 1 and 2 and becomes inoperative when either one of a pair of dogs 94, 96 carried by a member 98 rotating with the shaft 66 comes into engagement with the end of lever 92, which at that time lies in the position shown in Figs. 1 and 2. To cushion the blow of dogs 94, 96 against lever 92, the latter may be supplied with suitable buffer mechanism illustrated as comprising a U-shaped spring 100 backed up by a spring-pressed plunger 102. Thus it will be seen that when depression of treadle 82 is continued beyond the point necessary to bring the upper end of slot 88 into engagement with pin 90, lever 92 will be rocked in a counter-clockwise direction (as viewed in Figs. 1 and 2) and the clutch will be tripped.

Fulcrumed at 110 to the frame of the machine is a lever 112 the rear end of which is provided with a slot through which passes rod 86. A spring 114, surrounding rod 86 and bearing at its upper end on a collar 116 secured thereto, engages the rear end of lever 112 and when treadle 82 is depressed rocks lever 112 in a clockwise direction, as viewed in Figs. 1 and 2, thus raising the forward end of lever 112. Pivoted at its lower end to the forward end of lever 112 and at its upper end to the lower end of shaft 22 is a rod 118 which thus serves, during the first part of the depression of treadle 82, to lift the work support so as to bring the shoe to be operated upon into operative relation to mold 20. During this movement the operative will pull post 24 forwardly and will guide the work into the desired relation to mold 20, all prior to the tripping of the clutch. It should be noted that toggle members 32 and 34 are lifted with shaft 22, rod 38 rocking about eccentric 74.

In order to compensate for differences in the heights of the different work pieces to be operated upon, for example to compensate for variations in the heights of lasts upon which different shoes are mounted, means is provided forming an automatically adjustable abutment for the lower end of toggle member 34. It will be remembered that pin 40, carried at the lower end of toggle member 34, is mounted for vertical sliding movement in slots 44. As the work support and with it toggle members 32 and 34 are raised during the earlier part of the treadle movement, pin 40 moves upwardly in slots 44. Accordingly, a wedge member 120 is provided mounted for forward and rearward sliding movement between pin 40 and a surface formed upon the top of plunger 48. Wedge member 120 is connected at its rear end to a link 122 to which is anchored one end of a tension spring 124, the other end of which is secured to a pin 126 carried by plunger 48. Thus as toggle member 34 is moved upwardly during the first part of the depression of treadle 82, wedge member 120 is pulled forwardly by spring 124, contacting at all times with pin 40 and with the upper end of plunger 48.

Under heavy pressures the maximum angle permissible between the upper and lower surfaces of a simple wedge of hardened metal working between lubricated surfaces of hardened metal is about 7°. With a greater inclination such a wedge will slip under heavy pressure. To permit the use of a steeper and therefore shorter wedge in the illustrated machine, the inclined surfaces of the wedge 120 are beveled at their corners, as shown at 130, 132 in Figs. 3 and 4, the wedge being received in correspondingly beveled grooves formed in pin 40 and in the upper surface of plunger 48, respectively. This greatly increases the resistance of the wedge to slipping and accordingly permits the use of a much shorter and steeper wedge than would otherwise be possible. It has been found that in a machine of the type illustrated and with a wedge of this formation the angle between the upper and lower surfaces of the wedge may be as steep as 25 or 30 degrees when the corners of the wedge are beveled as shown, with the upper beveled surfaces converging at an angle of 20° and the lower beveled surfaces converging at an angle of 30°.

Means is provided for withdrawing wedge 120 as the machine is operated to lower the work support after a shoe has been operated on and for latching wedge 120 in its withdrawn position while the machine is at rest with the work support lowered. For this purpose a cam member 140 is mounted on shaft 66. Cam member 140 is provided with a circular groove 142 in which is inserted a member 144, one surface of which is formed on an arc of a circle of the same radius as the outer circumference of groove 142 and one surface of which is flat, being a chord of that arc. At its end member 144 is bounded by short surfaces at right angles to the flat surface. The right-hand end of member 144, as viewed in Fig. 1, is arranged to engage a semi-circular pin 146 projecting near the right-hand end of link 122. Pivoted to the rear end of treadle 82 is a crooked rod 150 normally held forward when the machine is at rest by a spring 152. Near its upper end link 150 is provided with a shoulder 154 positioned, when the machine is at rest, with the work support lowered, beneath a lug 156 formed upon link 122 as shown in Fig. 1. Thus, when treadle 82 is depressed, the rear end of link 122 is lifted by shoulder 154 so that semi-cylindrical pin 146 escapes from the right-hand end of member 144, permitting spring 124 to move wedge 120 forwardly as toggle 32, 34 is lifted by rod 118. Wedge 120 thus forms an automatically adjustable abutment, the ultimate forward position of which is determined by the extent to which the work support is raised by rod 118. Wedge 120 will remain in this forward position not only until the machine comes to rest at the conclusion of the first half cycle of rotation of shaft 66 but also during the earlier part of the succeeding half cycle after the machine is again tripped until, during the rotation of cam member 140, the forward end of member 144 comes into contact with semi-cylindrical pin 146, engaging the latter and forcing it, together with link 122 and wedge 120, rearwardly against the tension of spring 124.

In order to prevent damage to the machine if the clutch should be tripped otherwise than by the normal depression of treadle 82, a pin 160 is mounted at the extreme end of link 122 projecting into groove 142 and, when the machine is at rest, engaging the outer surface of that groove. If, with the parts of the machine in the position of Fig. 1, the clutch is tripped other than by the depression of treadle 82 and therefore without the lifting of link 122 by shoulder 154, pin 160 will be lifted, as link 122 is moved rearwardly, by the engagement of pin 160 with the outer surface of groove 142 to an extent sufficient to lift pin 146 enough to release that pin from the end of member 144 before any damage is done, thus permitting rotation of cam 140 without undue displacement of link 122.

In order to remove shoulder 154 and the upper end of rod 150 from the path of the right-hand end of link 122 as the latter moves rearwardly to permit the lowering of the work support even though the operator does not release treadle 82, the rearwardly extending end of rod 38 is provided with a downwardly projecting lug 164 arranged, as rod 38 moves rearwardly, to engage a surface formed at 166 near the end of rod 170. This forces the upper end of rod 150 to the rear out of the way of rod 122 and holds it in that position until the treadle is released. The return of the treadle to its normal position pulls rod 150 downwardly so that surface 166 escapes from lug 164 at which time rod 150 is pulled forwardly by spring 152, shoulder 154 on rod 150 taking up its position beneath lug 156 of link 122.

In order to assist in maintaining rod 150 in its proper position, it is provided with a slot 170 engaging a flat finger 172 formed upon the end of a lever 174 fulcrumed at 110, lever 174 also serving to limit forward movement of link 150 by means of a compression spring 176.

The herein-described wedge and the combination thereof with wedge engaging members are not claimed herein per se since they are the sole invention of Thomas H. Seely and are claimed in a copending application Serial No. 152,282, filed December 2, 1926, in his name.

Having described the invention, what we claim as new and desire to secure by Letters Patent of the United States is:

1. A machine for applying pressure to shoe parts having, in combination, thrust-receiving means, shoe-supporting means, means for causing relative pressure-applying movement of the shoe-supporting means and the thrust-receiving means to apply pressure to a shoe part upon the supporting means, a wedge having the edges of one of its relatively inclined surfaces beveled and engaging corresponding surfaces of one of said means whereby a relatively short, steep wedge may be used without danger of slipping, and means for moving said wedge transversely of the direction of the application of pressure to cause the pressure exerted upon the work to be uniform irrespective of variations in the heights of different work pieces operated on.

2. A machine for applying pressure to shoe parts having, in combination, a pair of thrust-receiving means, shoe-supporting means, means for causing relative pressure-applying movement of the shoe-supporting means and the thrust-receiving means to apply pressure to a shoe part upon the support, a wedge having the edges of its relatively inclined surfaces beveled and engaging corresponding surfaces formed upon or connected to two of said means, and means for moving said wedge transversely of the direction of the application of pressure to cause the pressure exerted upon the work to be uniform irrespective of variations in the heights of different work pieces operated on.

3. A machine for applying pressure to shoe parts having, in combination, a work support, thrust-receiving means arranged to engage a shoe part carried by the work support, an automatically variable thrust-receiving member co-operating with the work support to compensate for variations in the thickness of the different work pieces operated upon comprising a wedge having its relatively inclined surfaces beveled at their edges and received in correspondingly formed surfaces upon thrust-receiving and transmitting members with which the wedge contacts whereby a wedge having a relatively great angle between its inclined surfaces may be used without danger of slipping, and means tending to urge the wedge between the thrust-receiving and transmitting members.

4. A machine for applying pressure to shoes having, in combination, a thrust-receiving member and a shoe support relatively movable to apply pressure to the work, means for causing relative pressure-applying movement of said parts, a wedge arranged to receive pressure applied by said means, and means for moving said wedge in a direction transversely of the direction of the application of pressure to cause the pressure exerted upon different work pieces to be uniform irrespective of variations in the heights of the different work pieces operated upon, said wedge having one of its relatively inclined surfaces beveled at its edges and engaging correspondingly formed surfaces upon the member against which said wedge surface bears, whereby a relatively steep wedge may be used without danger of slipping.

5. A machine for operating upon shoe parts having, in combination, a work support, thrust-receiving means arranged to engage a work piece carried by the work support, means for causing relative movement of the thrust-receiving means and the work support to apply pressure to a work piece upon the work support, an automatically variable thrust bearing for the work support comprising a wedge having one of its relatively inclined surfaces beveled at the edges and received in correspondingly formed surfaces upon a member with which the wedge contacts whereby a wedge having a relatively great angle between its inclined surfaces may be used without danger of slipping, means tending to urge the thick end of the wedge under the work support prior to the application of pressure, and means for withdrawing the wedge after the release of the pressure.

6. A machine for applying pressure to shoe parts having, in combination, toggle mechanism, a work support carried thereby, thrust-receiving means arranged to engage a shoe part carried by the work support, an automatically variable thrust bearing for the end of the toggle remote from the work support comprising a wedge having its relatively inclined surfaces beveled at their edges and received in correspondingly formed surfaces upon the members with which the wedge contacts whereby a wedge having a relatively great angle between its inclined surfaces may be used without danger of slipping, and means tending to urge the thick end of the wedge under the work support.

7. A machine for operating upon shoes having, in combination, a shoe support, a thrust-receiving member, means for effecting an initial relative movement of the shoe and the thrust-receiving member to cause the shoe to engage the thrust-receiving member, power-operated means for effecting further relative movement of the shoe support and the thrust member, a steep wedge connected to said power-operated means and having the edges of its relatively inclined surfaces beveled and engaging correspondingly formed surfaces formed on members one of which is connected to the shoe support and the other of which serves to support the wedge, and means tending to move the wedge between said surfaces to cause the pressure exerted upon different work pieces to be uniform independent of variations in the heights of different work pieces operated on.

8. A machine for operating upon shoes having, in combination, a shoe support, a thrust-receiving member, means for effecting an initial relative movement of the shoe support and the thrust-receiving member to cause the shoe to engage the thrust-receiving member, power-operated means for effecting further relative movement of the shoe support and the thrust-receiving member, a stiff compression spring, automatically adjustable means projecting between the work support and said spring comprising a steep wedge having the edges of its relatively inclined surfaces beveled and engaging correspondingly formed surfaces formed on members connected to the shoe support and the compression spring respectively, and means tending to urge the wedge between said surfaces to cause the pressure exerted upon different work pieces to be uniform independent of variations in the height of different work pieces operated on.

9. A machine for molding the heel-seats of shoes having, in combination, a die formed and arranged to mold the heel portion of the sole of a shoe, a shoe support, pressure-applying mechanism connected thereto and operable to cause heavy molding pressure of the die upon the heel-seat of the shoe, and an automatically adjustable wedge arranged to cause the pressure exerted by said mechanism upon different work pieces to be uniform, independent of variations in the heights of different work pieces operated on.

10. A machine for molding the heel-seats of shoes having, in combination, a heel-seat die and a shoe support relatively movable to apply pressure to the work, a toggle for causing relative pressure-applying movement of said parts, an abutment for one end of the toggle, a wedge, means arranged to move the wedge in a direction substantially at right angles to the direction of the application of pressure an amount dependent upon the height of the work piece operated on to cause the pressure exerted upon different work pieces to be uniform irrespective of variations in the heights of different work pieces, and means for withdrawing the wedge after the pressure has been removed.

11. A machine for forming the heel-seats of shoes for the reception of wood heels having, in combination, a heel-seat die and a shoe support relatively movable to apply pressure to the work, a toggle for causing relative movement of said parts, a heavy spring forming an abutment for one end of the toggle, a wedge, and means for moving said wedge automatically in a direction toward and from the toggle to cause said wedge to operate as a variable abutment whereby the pressure exerted upon different work pieces by the straightening of the toggle is uniform irrespective of variations in the heights of different work pieces operated on.

12. A machine for forming the heel-seats of shoes for the reception of wood heels having, in combination, a die formed and arranged to mold the heel portion of the sole of a shoe to prepare it for the attachment of a wood heel, a shoe support, pressure-applying mechanism connected thereto operable to cause heavy molding pressure of the die upon the heel-seat of the shoe, and automatically adjustable means arranged to cause the pressure applied by said mechanism upon different work pieces to be uniform irrespective of variations in the heights of the different work pieces operated upon.

13. A machine for forming the heel-seats of shoes for the reception of wood heels having, in combination, a die formed and arranged to mold the heel portion of the sole of a shoe to prepare it for the attachment of a wood heel, a shoe support, toggle mechanism connected thereto and arranged when the toggle is straightened to cause heavy molding pressure of the die upon the heel-seat of the shoe, and an automatically adjustable thrust bearing for the toggle arranged to cause the pressure exerted by the toggle when straightened to be uniform independent of variations in the heights of the different lasts upon which the different shoes operated upon are mounted.

14. A machine for forming the heel-seats of shoes for the reception of wood heels having, in combination, a die formed to shape the heel-seat portion of the sole of a shoe by molding pressure, a shoe support, means for effecting an initial relative movement of the die and shoe support to cause the die and shoe to be brought into engagement in proper relative position and so held, power-operated means for effecting further relative movement of the shoe support and the die, a stiff spring arranged to control the pressure applied to the heel-seat by the die, and automatically adjustable means projecting between the work support and said spring arranged to cause the heel-seat forming pressure of the die upon the work to be uniform independent of variations in the heights of the different lasts upon which the different shoes operated upon are mounted.

15. A machine arranged to apply pressure to work pieces having, in combination, a frame provided with two thrust-receiving portions, two work-engaging members arranged to engage opposite surfaces of the work piece operated upon, means for causing relative pressure-applying movement of one of the work-engaging members and the thrust-receiving portions of the frame to apply pressure to the work piece, a wedge having the edges of one of its inclined surfaces beveled and engaging a correspondingly formed surface upon one of the above-mentioned parts of the machine whereby a relatively short, steep wedge may be used without danger of slipping, and means for locating said wedge transversely of the direction of the application of pressure to cause the pressure exerted upon the work to be uniform irrespective of variations in the heights of different work pieces operated on.

16. A machine arranged to apply pressure to work pieces having, in combination, a frame provided with two thrust-receiving portions, two work-engaging members arranged to engage opposite surfaces of the work piece operated upon, means for causing relative pressure-applying movement of one of the work-engaging members and the thrust-receiving portions of the frame to apply pressure to the work piece, a wedge having the edges of its inclined surfaces beveled and engaging correspondingly formed opposed surfaces upon two of the above-mentioned parts of the machine, and means for locating said wedge transversely of the direction of the application of pressure to cause the pressure exerted upon the work to be uniform irrespective of variations in the heights of different work pieces operated on.

17. A machine for operating on work pieces having, in combination, means to apply pressure to a work piece, a pair of abutments arranged to receive the thrust of the pressure applied to the work piece by said means, one of said abutments being yielding to limit the pressure that can be applied by the pressure-applying means to the work piece, a wedge co-operating with the pressure-applying means to compensate for variations in the heights of different work pieces operated upon, said wedge having one of its relatively inclined surfaces beveled and engaging a correspondingly arranged surface formed upon one of the above-mentioned parts of the machine, means for moving the wedge transversely of the direction of the application of pressure to position the wedge in accordance with the height of the particular work piece operated upon, and means for withdrawing the wedge after the pressure has been released.

18. A machine for operating on work pieces having, in combination, means to apply pressure to a work piece, a pair of abutments arranged to take up the thrust of the pressure applied to the work piece by said means, a spring supporting one of said abutments to limit the pressure that can be applied to the work piece, a wedge co-operating with the pressure-applying means to compensate for variations in the heights of different work pieces operated upon, said wedge having one of its relatively inclined surfaces beveled and engaging a correspondingly arranged surface formed upon one of the above-mentioned parts of the machine, means for moving the wedge transversely of the direction of the application of pressure to position the wedge in accordance with the height of the particular work piece operated upon, and means for withdrawing the wedge after the pressure has been released.

19. A machine for molding the heel-seats of shoes having, in combination, a die formed and arranged to mold the heel portion of the sole of a shoe, a shoe support, pressure applying mechanism connected thereto and operable to cause heavy molding pressure of the die upon the heel-seat of the shoe, and a wedge constructed and arranged to take up the space between the shoe and die due to variations in the heights of shoe lasts whereby the pressure applied will be uniform notwithstanding the variations in the heights of the lasts.

20. A machine for molding the heel-seats of shoes having, in combination, a heel-seat die, a support for sustaining a shoe and last, said support being movable into and out of position to locate the heel-seat of the shoe opposite the die and the die and support being spaced apart to permit such positioning movement, a toggle for causing relative pressure applying movement of the shoe support and die, a wedge constructed and arranged to take up the space between the shoe and die, and power-operated means for straightening the toggle to effect said relative pressure applying movement of the shoe support and die.

21. A machine for forming the heel-seats of shoes for the reception of wood heels having, in combination, a heel-seat die, a support for a shoe and last movable into and out of position beneath the die and movable heightwise of the shoe toward the die, the die and support being initially spaced apart to permit movement of the shoe on the support into position beneath the die, a wedge constructed and arranged for movement transversely of the direction of heightwise movement of the support to take up the space between the shoe and die, a toggle connected at one end to the support for causing movement of the support heightwise of the shoe toward the die, a heavy spring forming an abutment for the other end of the toggle, and power-operated means for straightening the toggle, the construction and arrangement being such that irrespective of the initial space between the shoe and die the spring will be compressed a uniform amount and hence the pressure applied to the heel-seats of different shoes will be the same.

22. A machine of the class described having, in combination, a die arranged to engage the rear portion of a shoe bottom, a support for a shoe and last, said die and support being spaced apart to permit introduction of a shoe between the support and die, means constructed and arranged for automatic operation to take up the space between the shoe and die due to variations in the heights of the lasts, and pressure-applying mechanism connected to the support and operable to cause heavy molding pressure of the die upon the shoe whereby the pressure applied will be uniform notwithstanding variations in the heights of lasts.

23. A machine of the class described having, in combination, a die arranged to engage the rear portion of a shoe bottom, a support for the shoe, said die and support being initially spaced apart to permit introduction of the shoe between the support and die, means initially operable to take up the space between the shoe and die, and pressure-applying mechanism connected to the support and operable to cause heavy molding pressure of the die upon the shoe whereby the pressure applied will be uniform notwithstanding variations in the initial space between the die and shoe.

In testimony whereof we have signed our names to this specification.

MILTON H. BALLARD.
THOMAS H. SEELY.